2,988,434
AUXILIARY FUELS
Ralph I. Gottshall, Willow Grove, and Howard W. Swain, Drexel Hill, Pa., assignors to Gulf Oil Corporation, Pittsburgh, Pa., a corporation of Pennsylvania
No Drawing. Filed Jan. 14, 1957, Ser. No. 633,847
6 Claims. (Cl. 44—53)

This invention relates to a corrosion inhibiting composition useful for inhibiting corrosion of metal parts coming into contact with aqueous fluids. More particularly, this invention is concerned with a composition for inhibiting corrosion of metal parts which are in contact with the aqueous fluids used in aircraft engine injection systems.

Fluid injection systems are often installed as auxiliary engine equipment in large aircraft which are used in heavy-load service. The purpose of these systems is to enable the engines to deliver more horsepower during the critical take-off period in order that maximum loads can be carried without undue hazard. This is accomplished by injecting a solution of water and alcohol directly into the combustion chamber with the fuel-air mixture. The resulting increase in the mass of combustion gases provides the extra horsepower needed for take-off in both piston and turbine powered aircraft. Since water has a cooling effect on the fuel-air mixture, an additional advantage is obtained with piston engines in that detonation is suppressed.

As mentioned heretofore, the fluids used in these systems comprise mixtures of water and alcohol. The purpose of the alcohol is to depress the freezing point as well as to facilitate the vaporization of water. Although methanol is generally used mainly because of availability and economy, any other water-soluble alcohol would be satisfactory. Examples of some such alcohols are ethanol, isopropanol, t-butyl alcohol and ethylene glycol. The relative proportion of water to alcohol is limited only by the requirement that the concentration of alcohol must be sufficient to prevent solidification of the water at the temperatures encountered in aircraft operation.

It is a generally known fact that mixtures of water and alcohol tend to induce corrosion on metals. Consequently, it is necessary to incorporate a corrosion inhibitor within these mixtures prior to use in order to protect metal parts which come in contact therewith.

Known water-soluble rust inhibitors of the prior art have been tried but in general have been found unsatisfactory because they do not possess all of the specialized requirements needed for this unique application.

A limited class of fluid injection compositions having incorporated therein, as an essential ingredient, a metal-containing organic corrosion inhibitor has been found to satisfy the specialized corrosion inhibiting and compatibility requirements. However, it has been found after testing such compositions in aircraft engines that they leave an ash residuum following combustion in the engines. This creates a serious hazard particularly with turbine powered aircraft because temperatures often exceeding 2000° F. are experienced in the combustion chamber during operation. At these high temperatures non-combustible ash is not blown out the exhaust but tends rather to literally "bake on" delicately balanced rotating parts. This results in an unbalanced condition in the rotor which is magnified greatly by the high speeds attained during operation.

Aside from providing corrosion protection, the injection fluid compositions must not be adversely affected by contact with polyvalent metal ions associated with so called "hard water." Experience with conventional water-soluble rust inhibitors has shown that they cause insoluble precipitates to form when magnesium and calcium containing inorganic salts are present in water into which the inhibitors are incorporated. Besides rendering the inhibitor unavailable for corrosion protection, the insoluble precipitates which form tend to clog the small passages of the injection system. Such obstruction of the fluid passageways will impair function or even make operation impossible.

As is well known, the degree of water "hardness" varies considerably between localities and geographical areas. This means that the inhibitor must be adapted to function in water which varies over a wide range in degree of "hardness."

Finally, the inhibtor must provide good corrosion protection for a variety of metals which are used in aircraft parts, and particularly for aluminum and steel. The protection must be effective when the aircraft is at high altitudes as well as on the ground. This, of course, requires that the inhibitor be soluble in water-alcohol solutions over a wide range of temperatures.

We have now found a class of compounds that completely satisfy all of the foregoing requirements; namely, oxygen containing amine salts of diisoamyl orthophosphoric acid wherein the oxygen containing amine substituent is an alkanolamine or alkanolamine anhydride having a sum total of from 1 to 8 carbon atoms.

These compounds can be conveniently prepared by reacting one part of phosphorus pentoxide with four parts of isoamyl alcohol to form the dialkyl phosphoric acid ester in the conventional manner well known to the art. The resulting dialkyl phosphoric acid ester is then neutralized to a substantially neutral pH with the alkanolamine or alkanolamine anhydride of choice to form the oxygen containing amine salt of this invention. We have found that primary, secondary or tertiary alkanolamines or anhydrides thereof which meet the aforementioned requirements are suitable. The carbon chain of the alkanol substituents can be straight, branched or cyclic. Neutralization with isopropanolamine forms the preferred salt since the resulting product has distinctly superior solubility in water-alcohol mixtures over that of other suitable counterparts.

We have found that the incorporation into aqueous solutions of from about 0.002% to about 1% total weight of the foregoing compositions imparts satisfactory corrosion inhibiting properties for most purposes. More can be added if desired without harmful effect. Excellent results have been obtained using 0.25% by weight in aircraft engine injection fluids.

Although generally not required, in some instances a sequestering agent such as the isopropanolamine salt of ethylenediaminetetraacetic acid may be added with benefit to reduce the troublesome effect of an exceptionally large concentration of "hard water" producing ions when such is encountered.

We have shown that the inhibitors of our invention are not adversely affected by water which has a relatively high concentration of "hard water" producing ions. This was demonstrated by preparing samples which contained 0.25 percent by weight of inhibitor in a synthetic "hard water" equivalent in hardness to 600 p.p.m. of $CaCO_3$. The samples were stored for 14 days and then observed for signs of precipitation. The results are shown in the following table:

| Example No. | Control | 1 | 2 | 3 | 4 | 5 |
|---|---|---|---|---|---|---|
| Make-up—Percent by Wt.: | | | | | | |
| Synthetic Hard Water [a] | 100.0 | 99.75 | 99.75 | 99.75 | 99.75 | 99.75 |
| Salts of Diisoamyl Orthophosphoric Acid— | | | | | | |
| Isopropanolamine | | 0.25 | | | | |
| Diisopropanolamine | | | 0.25 | | | |
| Triethanolamine | | | | 0.25 | | |
| Morpholine | | | | | 0.25 | |
| Monoethanolamine | | | | | | 0.25 |
| Inspection: | | | | | | |
| Storage Stability Test, 14 Days, Room Temp.— | | | | | | |
| Appearance | bright | bright | bright | bright | bright | bright |
| Precipitate | nil | nil | nil | nil | nil | nil |

[a] Prepared by the addition of 1.31 grams of $CaCl_2 \cdot 6 H_2O$ per liter of water.

We have demonstrated the efficacy of our corrosion inhibiting compounds by conducting tests in accordance with the provisions of Wright Field Test ML TN–WCRT 52–161 for aircraft engine injection fluids. The activity of the corrosion inhibitor was tested in a solution by weight of 79.75% tap water, 20% methanol and 0.25% inhibitor. The test was run by placing into glass containers an amount of the particular liquid tested sufficient to cover one-half of a 1″ x 5″ metal test panel and then sealing the container. The metal test panel was observed periodically for corrosion. The metals tested were 1020 low-carbon steel and couples of 18–8 stainless steel with 24 ST aluminum. To pass the test, no significant corrosion should appear after 28 days at room temperature on any portion of the panels immersed in the liquid. The results are given in Table I below.

TABLE I

| Example No. | Control | 1 | 2 | 3 | 4 | 5 |
|---|---|---|---|---|---|---|
| Make-up, Percent by Wt.: | | | | | | |
| Methanol | 80 | 79.75 | 79.75 | 79.75 | 79.75 | 79.75 |
| Tap Water | 20 | 20 | 20 | 20 | 20 | 20 |
| Salts of Diisoamyl Orthophosphoric Acid— | | | | | | |
| Isopropanolamine | | 0.25 | | | | |
| Ethanolamine | | | 0.25 | | | |
| Diethanolamine | | | | 0.25 | | |
| Triethanolamine | | | | | 0.25 | |
| Morpholine | | | | | | 0.25 |
| Inspection: | | | | | | |
| Corrosion Test ML TN–WCRT 52–161, 28 Day at Room Temp.— | | | | | | |
| Appearance, Steel Strip [a] | 4 | 1 | 2 | slight stain | slight stain | 1 |
| Appearance, Aluminum Strip, Coupled with Stainless Steel Strip [a] | 4 | slight stain | 1 | 1 | 1 | 1 |

[a] A rating of "slight stain" indicates trace corrosion. A rating of 1 indicates trace to 5% corrosion. A rating of 2 indicates 6 to 25% corrosion. A rating of 3 indicates 26 to 50% corrosion. A rating of 4 indicates over 51% corrosion.

In addition to the foregoing test, examples of applicants' invention were also tested for corrosion and rust inhibiting properties according to ASTM D665–54 modified in that no oil was present nor was additional water added. The results of these tests are shown in Table II following:

TABLE II

| Example No. | Control | 1 | 2 | 3 | 4 | 5 |
|---|---|---|---|---|---|---|
| Make-up, Percent by Wt.: | | | | | | |
| Distilled Water | 100 | 99.988 | 99.988 | 99.988 | 99.988 | 99.988 |
| Salts of Diisoamyl Orthophosphoric Acid— | | | | | | |
| Isopropanolamine | | 0.012 | | | | |
| Ethanolamine | | | 0.012 | | | |
| Diethanolamine | | | | 0.012 | | |
| Triethanolamine | | | | | 0.012 | |
| Morpholine | | | | | | 0.012 |
| Rust Test ASTM D 665–54—Procedure A: | | | | | | |
| Steel Rod: Appearance— | | | | | | |
| 4 Hr. Rating [a] | 4 | 0 | 0 | 0 | 0 | 0 |
| 24 Hr. Rating [a] | 4 | 0 | 0 | 0 | 0 | 1 |

[a] A rating of 0 indicates no rust. A rating of 1 indicates trace to 5% rust. A rating of 2 indicates 6 to 25% rust. A rating of 3 indicates 26% to 50% rust. A rating of 4 indicates over 51% rust.

In addition to the embodiments of our invention which are shown in the above tables, other workable compositions can be formulated in accordance with the following where the proportions of the ingredients are given on a percentage by weight basis:

Example 1

| | |
|---|---|
| Water | 49.875 |
| Methanol | 49.875 |
| Isopropanolamine salt of diisoamyl orthophosphoric acid | 0.250 |

Example 2

| | |
|---|---|
| Water | 49.75 |
| Ethanol | 49.75 |
| Diethanolamine salt of diisoamyl orthophosphoric acid | 0.50 |

Example 3

| | |
|---|---|
| Water | 73.815 |
| Ethylene glycol | 25.935 |
| Morpholine salt of diisoamyl orthophosphoric acid | 0.250 |

Example 4

| | |
|---|---|
| Water | 73.63 |
| Isopropanol | 25.87 |
| Triethanolamine salt of diisoamyl orthophosphoric acid | 0.50 |

The corrosion inhibiting compositions of our invention can be used in any instance where metals are corroded by aqueous fluids. They can be added with good effect to aqueous cooling systems, hydraulic systems and to the aqueous layer which may be present in metal tanks used for storage of petroleum products. They are, however, particularly adapted for injection into aircraft engines.

It will be understood that other materials can be added to the compositions of this invention in addition to the ingredients disclosed herein without departing from the spirit of the invention. Examples of such materials include dyes, anti-leak agents and water-softening compositions.

The term "consisting essentially of" as used in the claims does not exclude minor additions of ingredients which do not affect the basic characteristics of the composition, such as the materials mentioned in the preceding paragraph.

We claim:

1. A composition useful as an aircraft engine injection fluid consisting essentially of water and an amount sufficient to depress the freezing point of a water-soluble alcohol and having incorporated therein from about 0.002 percent to about 1 percent by weight of an oxygen containing amine salt of diisoamyl orthophosphoric acid wherein the oxygen containing amine substituent is selected from the group consisting of alkanolamines containing a sum total of from 1 to 8 carbon atoms and the anhydrides thereof.

2. The composition of claim 1 wherein the alcohol is methanol and the salt is the isopropanolamine salt of diisoamyl orthophosphoric acid.

3. The composition of claim 1 wherein the alcohol is methanol and the salt is the ethanolamine salt of diisoamyl orthophosphoric acid.

4. The composition of claim 1 wherein the alcohol is methanol and the salt is diethanolamine salt of diisoamyl orthophosphoric acid.

5. The composition of claim 1 wherein the alcohol is ethanol and the salt is the triethanolamine salt of diisoamyl orthophosphoric acid.

6. The composition of claim 1 wherein the alcohol is ethanol and the salt is the morpholine salt of diisoamyl orthophosphoric acid.

References Cited in the file of this patent

UNITED STATES PATENTS

| | | |
|---|---|---|
| 1,992,689 | Cox | Feb. 26, 1935 |
| 2,167,867 | Benning | Aug. 1, 1939 |
| 2,193,965 | Hochwalt | Mar. 19, 1940 |
| 2,491,222 | Smith et al. | Dec. 13, 1949 |
| 2,504,361 | Van Hartesveldt | Apr. 18, 1950 |
| 2,673,144 | Huggler | Mar. 23, 1954 |
| 2,728,643 | Vaughn | Dec. 27, 1955 |
| 2,863,746 | Cantrell et al. | Dec. 9, 1958 |

FOREIGN PATENTS

| | | |
|---|---|---|
| 479,346 | Great Britain | Jan. 31, 1938 |
| 643,498 | Great Britain | Sept. 20, 1950 |
| 745,371 | Great Britain | Feb. 22, 1956 |